(12) United States Patent
Takeda et al.

(10) Patent No.: US 10,750,527 B2
(45) Date of Patent: Aug. 18, 2020

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Shimpei Yasukawa, Tokyo (JP); Satoshi Nagata, Tokyo (JP); Xiaohang Chen, Beijing (CN); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/483,334

(22) PCT Filed: Feb. 2, 2018

(86) PCT No.: PCT/JP2018/003547
§ 371 (c)(1),
(2) Date: Aug. 2, 2019

(87) PCT Pub. No.: WO2018/143396
PCT Pub. Date: Aug. 9, 2018

(65) Prior Publication Data
US 2019/0357243 A1    Nov. 21, 2019

(30) Foreign Application Priority Data
Feb. 3, 2017   (JP) ................................. 2017-018952

(51) Int. Cl.
*H04W 72/12*   (2009.01)
*H04W 72/04*   (2009.01)
*H04W 52/54*   (2009.01)

(52) U.S. Cl.
CPC ....... *H04W 72/1268* (2013.01); *H04W 52/54* (2013.01); *H04W 72/0413* (2013.01); *H04W 72/0473* (2013.01)

(58) Field of Classification Search
CPC .................................................... H04W 72/042
See application file for complete search history.

(56) References Cited

U.S. PATENT DOCUMENTS 10,028,302 B2 *  7/2018  Au ................... H04L 5/0041
10,560,901 B2 *  2/2020  Jung ................. H04W 72/1289
(Continued)

OTHER PUBLICATIONS

International Search Report issued in PCT/JP2018/003547 dated Apr. 24, 2018 (5 Pages).
(Continued)

*Primary Examiner* — Joshua L Schwartz
(74) *Attorney, Agent, or Firm* — Osha Liang LLP

(57) ABSTRACT

The present invention is designed to provide a user terminal and a radio communication method, whereby adequate communication can be performed when contention-based UL transmission is employed. A user terminal according to the present invention has a transmission section that transmits UL data and a reference signal without a UL transmission command from a radio base station, and control section that controls transmission of the UL data and the reference signal, and the control section applies a reference signal that can identify the user terminal, as the reference signal, and controls transmission of the UL data and the reference signal by using predetermined resources that are configured in advance.

10 Claims, 11 Drawing Sheets

(56) References Cited

U.S. PATENT DOCUMENTS

2018/0007665 A1\* 1/2018 Goto .................... H04W 52/38
2018/0048498 A1\* 2/2018 Stern-Berkowitz .........................
H04L 27/0006

OTHER PUBLICATIONS

Written Opinion of the International Searching Authority issued in PCT/JP2018/003547 dated Apr. 4, 2018 (4 Pages).
Ericsson; "On Channel Estimation for Shared Grant-Free Access"; TSG-RAN WG1 #87, R1-1612954; Reno, Nevada, US, Nov. 14-18, 2016 (4 Pages).
NTT Docomo, Inc.; "On UL grant free for URLLC" 3GPP TSG RAN WG1 AH_NR Meeting, R1-1700627; Spokane, USA, Jan. 16-20, 2017 (5 Pages).
Samsung; "Grant-free based multiple access"; 3GPP TSG RAN WG1 NR Ad Hoc, R1-1701003; Spokane, Washington, USA, Jan. 16-20, 2017 (5 Pages).
NTT Docomo, Inc.; "Uplink power control considering waveform switching"; 3GPP TSG-RAN WG1-NR, R1-1700601; Spokane, USA, Jan. 16-20, 2017 (3 Pages).
Ericsson; "On Reference Signal Design for Grant-free Access"; 3GPP TSG RAN WG1 AH_NR Meeting, R1-1700691; Spokane, Washington, US, Jan. 16-20, 2017 (3 Pages).

\* cited by examiner

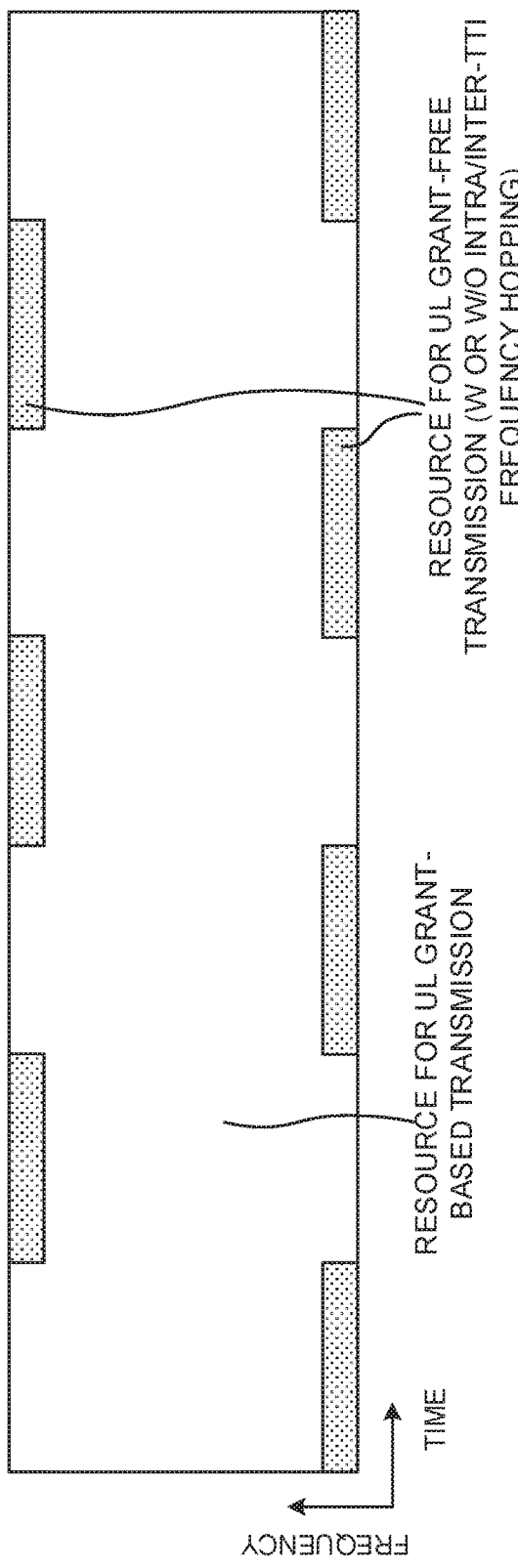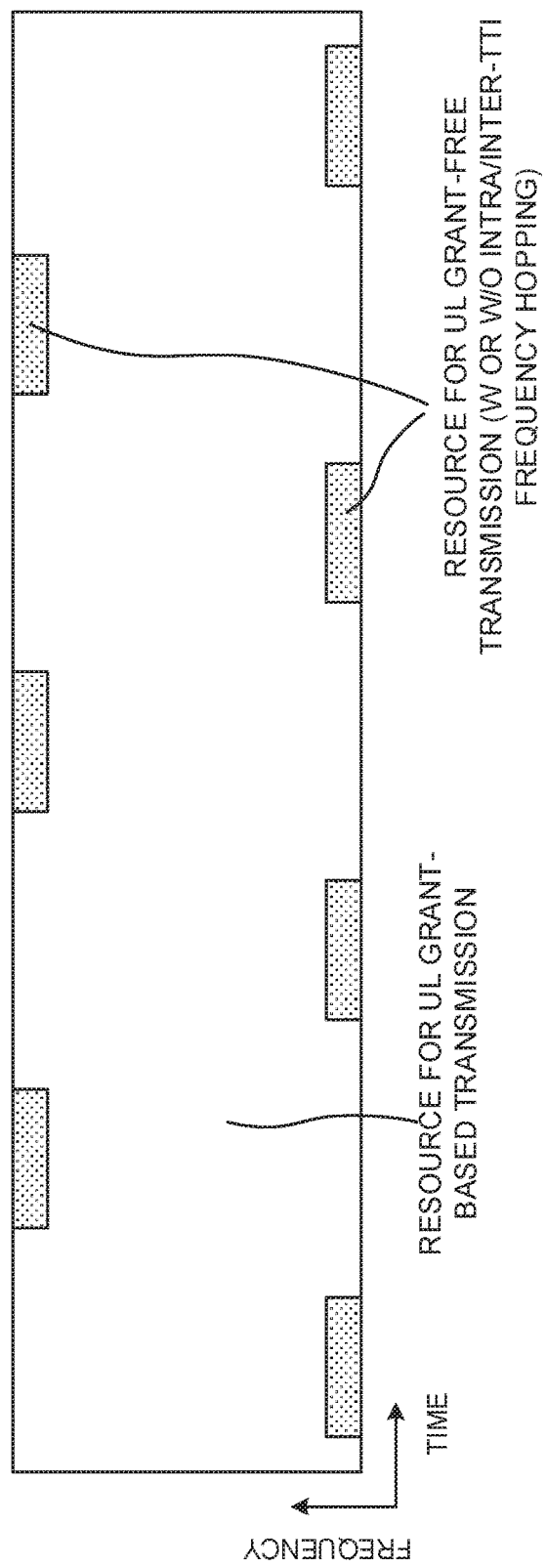

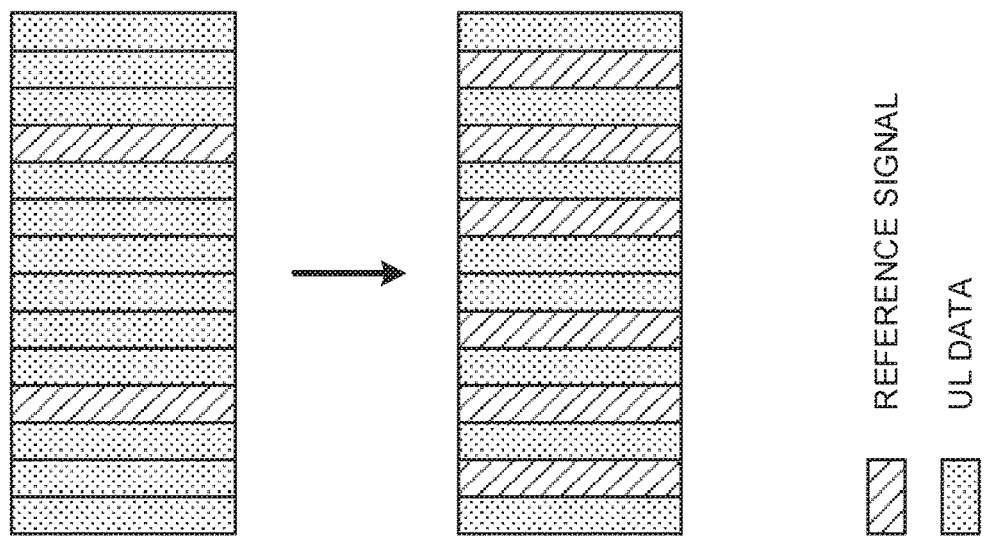
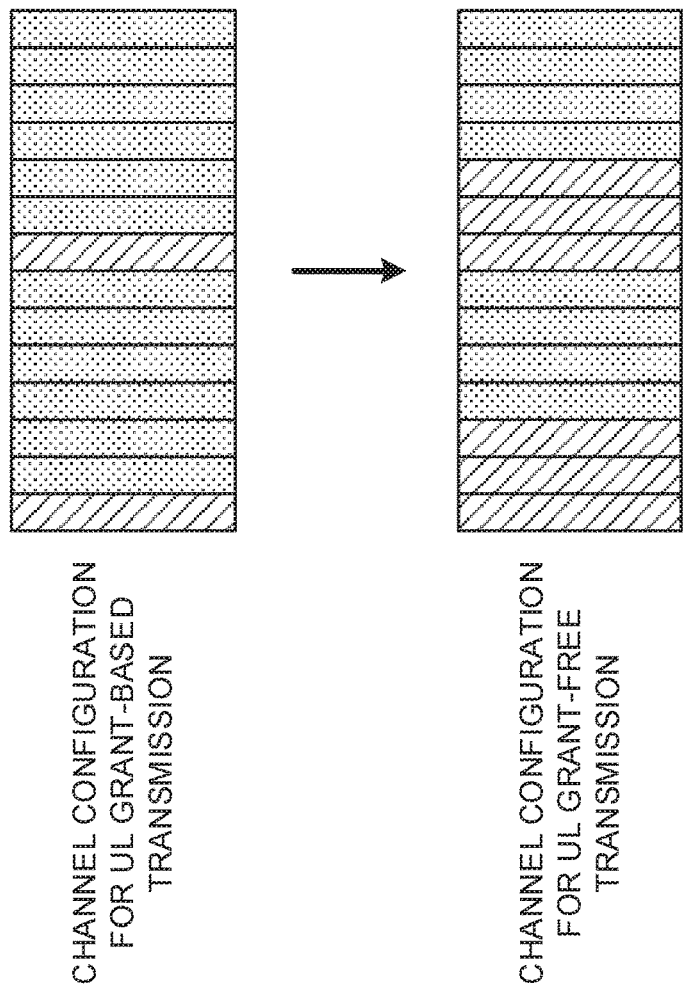
FIG. 4B
FIG. 4A

USER TERMINAL AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

A radio base station controls the allocation (scheduling) of data for a user terminal, and reports the schedule of data to the user terminal using downlink control information (DCI). The user terminal controls receipt of DL data and transmission of uplink data based on the downlink control information. For example, in existing LTE systems, when a user terminal receives downlink control information that commands UL transmission (for example, a UL grant), after a predetermined period (for example, 4 ms later), the user terminal transmits uplink data in a predetermined subframe.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, LTE Rel. 14, 15 or later versions, 5G, NR, etc.) may control data scheduling based on different configurations than existing LTE systems (for example, LTE Rel. 13 or earlier versions). For example, in order to provide communication services that require low latency and high reliability (for example, URLLC (Ultra Reliable and Low Latency Communications)), research is underway to reduce communication latency (latency reduction).

To be more specific, in order to reduce the latency time before UL data transmission starts, study is in progress to perform communication by permitting collisions of UL transmissions among a plurality of user terminals. For example, study is underway to allow user terminals to transmit UL data without UL grants from radio base stations (also referred to as "UL grant-free UL transmission," "UL grant-less UL transmission," "contention-based UL transmission," "UL grant-less and contention-based UL transmission," and so on).

However, what kind of control is executed when user terminals adopt contention-based UL transmission and transmit UL data is not decided yet, and it is difficult to apply methods for existing LTE systems that are premised on UL grant-based UL transmission.

The present invention has been made in view of the above, and it is therefore an object of the present invention to provide a user terminal and a radio communication method, whereby adequate communication can be performed when contention-based UL transmission is employed.

Solution to Problem

According to one aspect of the present invention, a user terminal has a transmission section that transmits UL data and a reference signal without a UL transmission command from a radio base station, and a control section that controls transmission of the UL data and the reference signal, and, in this user terminal, the control section applies a reference signal that can identify the user terminal, as the reference signal, and controls transmission of the UL data and the reference signal by using predetermined resources that are configured in advance.

Advantageous Effects of Invention

According to the present invention, when contention-based UL transmission is applied, communication can be performed adequately.

BRIEF DESCRIPTION OF DRAWINGS

FIGS. 3A and 3B are diagrams to show examples of resources for use in UL grant-free transmission;

FIGS. 4A and 4B are diagrams to show examples of channel configurations for use in UL grant-free transmission;

DESCRIPTION OF EMBODIMENTS

Future radio communication systems are expected to accommodate various services such as high-speed and large-capacity communication (eMBB: enhanced Mobile Broad Band), massive access (mMTC: massive MTC) from devices (user terminals) for inter-device communication (M2M: Machine-to-Machine) such as IoT (Internet of Things) and MTC (Machine Type Communication), low-latency and high-reliability communication (URLLC: Ultra-Reliable and Low Latency Communication), in a single framework.

To fulfill the demand of URLLC, it may be necessary, for example, to keep the delay on the U-plane 0.5 ms or less, and transmit information of a predetermined payload size with reliability of BLER (Block Error Rate)=$10^{-5}$, within 0.5 ms or 1 ms.

Figure 1A:
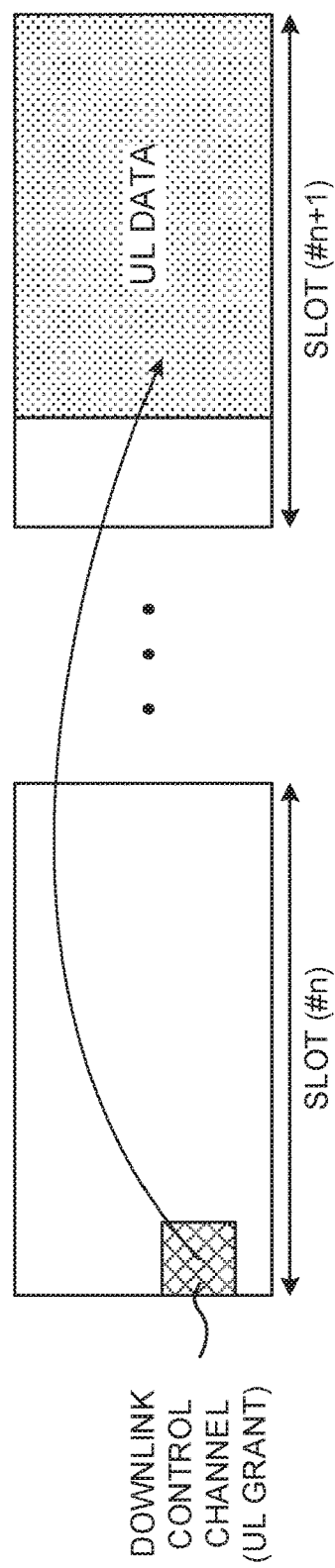
FIG. 1A is a diagram to explain UL grant-based transmission.
Figure 1B:
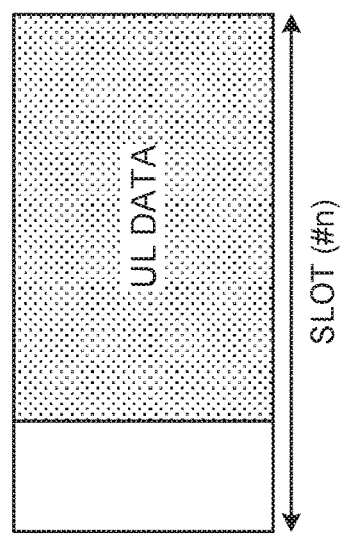
FIG. 1B is a diagram to explain UL grant-free transmission.

To fulfill the demand of URLLC, UL grant-based transmission alone is not enough, and it is necessary to apply UL grant-free transmission. Here, UL grant-based transmission and UL grant-free transmission will be explained. FIG. 1A is a diagram to explain UL grant-based transmission, and FIG. 1B is a diagram to explain UL grant-free transmission.

In UL grant-based transmission, as shown in FIG. 1A, a radio base station transmits a downlink control channel (UL grant), which commands allocation of UL data (PUSCH), and a user terminal transmits UL data in accordance with the UL grant. Meanwhile, in UL grant-free transmission, as shown in FIG. 1B, a user terminal transmits UL data without receiving UL grants for data scheduling.

However, when UL data is transmitted by applying UL grant-free transmission, what kind of control is to be executed is the problem. For example, while, in existing LTE systems, a radio base station can dynamically allocate resources for use for UL data transmission by using UL grants, in UL grant-free transmission, the radio base station cannot dynamically allocate resources for use for UL data transmission. Therefore, how to control resource fields for UL grant-free transmission is the problem.

The present inventors have focused on the fact that, from the perspective of avoiding collisions between UL data in UL grant-free transmission and UL data in UL grant-based transmission, it is preferable to separate between resource fields for UL grant-free transmission and resource fields for UL grant-based transmission. Consequently, the present inventors have arrived at pre-configuring resource fields (reserved resources) for allocating UL data to be sent in UL grant-free transmission, and controlling assignment of UL grant-free transmission. For example, resources for use in UL grant-free transmission may be configured as in UL semi-persistent scheduling (SPS).

When user terminals transmit UL data by applying UL grant-free transmission, it might occur that a plurality of pieces of UL data that are allocated to the same resource collide with each other, and the radio base station is unable to receive the UL data properly. In this case, although a retransmission command or the like may be reported from the radio base station side to the user terminals so as to have UL data retransmitted, the problem is how to identify (find, discover, etc.) the user terminals that have transmitted the UL data, on the radio base station side.

Therefore, for the purpose of identifying user terminals that have transmitted UL data, on the radio base station side, the present inventors have focused on reference signals that are transmitted simultaneously with UL data. These reference signals may include reference signals for demodulation, preambles for signal discovery, and so on. That is, with embodiments of the present invention, user terminals that have transmitted UL data are identified by using reference signals, instead of using data that is more likely to collide. The reason is that reference signals, which can be multiplexed between user terminals, can be received at the radio base station side even when UL data collides. Therefore, with the present invention, reference signals are configured so that user terminals can identify them.

That is, according to one aspect of the present invention, a user terminal has a transmission section that transmits UL data and a reference signal without a UL transmission command from a radio base station, and a control section that controls transmission of the UL data and the reference signal, and the control section applies a reference signal that can identify the user terminal, as the reference signal, and controls transmission of the UL data and the reference signal by using predetermined resources that are configured in advance.

According to one aspect of the present invention, the predetermined resources are preferably configured in a plurality of frequency fields.

In order to increase the number of UEs that can be identified in UL grant-free transmission, it is effective to increase the orthogonality of reference signals (the number of reference signals that can be multiplexed). In the event reference signals are configured so that user terminals can identify them, increasing the number of reference signals in the frequency domain so to increase the orthogonality of reference signals (the number of reference signals that can be multiplexed) may lead to reducing the resources that can be used for other services, UL data transmission based on UL grants, and so on. So, the present inventors come up with the idea of adopting a configuration (channel configuration) that increases reference signals in the time direction.

That is, according to one aspect of the present invention, UL data transmission (UL grant-free transmission) is carried out by using a channel configuration, in which more reference signals are configured than in the channel configuration for use for UL data that is transmitted based on UL transmission commands (UL grant-based transmission).

Also, according to one aspect of the present invention, new data transmission after UL data transmission (UL grant free transmission) and/or retransmission of UL data in UL grant-free transmission are preferably carried out based on UL transmission commands from radio base stations. This is because, in UL grant-free transmission, the efficiency of the use of resources is low.

(Resource Configuration for Use in UL Grant-Free Transmission)

Figure 2:
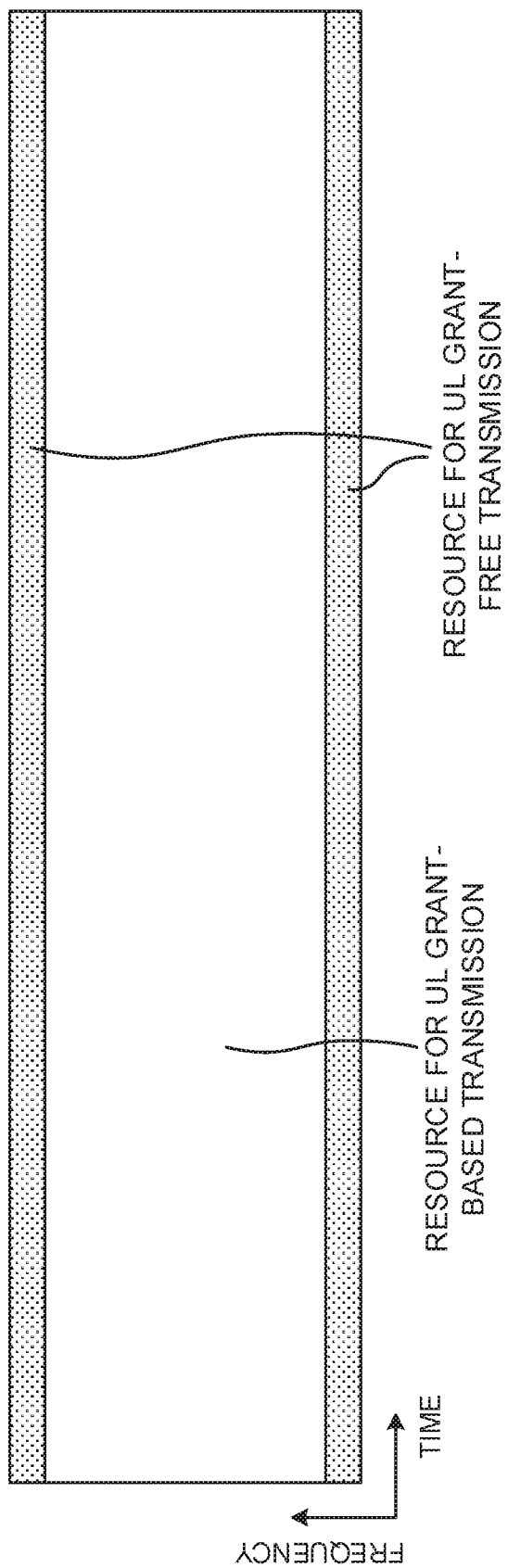
FIG. 2 is a diagram to show example of resources for use in UL grant-free transmission.

FIG. 2 is a diagram to show example of resources for use in UL grant-free transmission. In the resource configuration shown in FIG. 2, a frequency resource for use in UL grant-based transmission is provided between two frequency resources for use in UL grant-free transmission. The resources for use in UL grant-free transmission are provided over all time. As shown in FIG. 2, by configuring the frequency resources for use in UL grant-free transmission in a discrete manner, when there is no response from the radio base station, or when different data is retransmitted using different frequencies in UL grant-free transmission, a frequency diversity effect can be anticipated.

FIGS. 3A and 3B are diagrams to show examples of resources for use in UL grant-free transmission. Also, in the resource configuration shown in FIG. 3A, frequency resources for use in UL grant-based transmission are provided between two frequency resources for use in UL grant-free transmission. In resources for use in UL grant-free transmission, given two frequency resources, one frequency resource is configured intermittently in time, and the other frequency resource is configured in times where one frequency resource is not configured. Therefore, resources are provided for UL grant-free transmission over the entire time. In the resource configuration shown in FIG. 3A, inter-TTI frequency hopping or intra-TTI frequency hopping may be used.

Also in the resource configuration shown in FIG. 3B, a frequency resource for use in UL grant-based transmission is provided between two frequency resources for use in UL grant-free transmission. The resources for use in UL grant-free transmission are configured alternately in time, intermittently, in two frequency resources. In this resource configuration, there are times where resources for use in UL grant-free transmission are not provided.

The above-described resources for use in UL grant-free transmission can be configured semi-statically. Also, these resources may be reported by higher layer signaling such as RRC signaling, system information, broadcast signals and so on, or may be reported in downlink control information such as the PDCCH.

(Channel Configuration for Use in UL Grant-Free Transmission (Positions for Arranging Reference Signals, Etc.))

Channel configuration used in UL grant-free transmission to increase the number of user terminals to be identified in UL grant-free transmission will be described. This channel configuration is a channel configuration in which more reference signals are configured than in the channel configuration for use for UL data in UL grant-based transmission. In this case, if reference signals are increased in the frequency direction, resources that can be used for other services and UL grant-based UL data transmission are reduced, so that a configuration (channel configuration) that increases reference signals in the time direction is adopted.

FIGS. 4A and 4B are diagrams to show examples of resources for use in UL grant-free transmission. The channel configuration of FIG. 4A is a channel configuration for use in UL grant-based transmission, and reference signals (RSs) are provided in two symbols in one slot (or one subframe). Meanwhile, the channel configuration in FIG. 4a bottom of A is a channel configuration for use in UL grant-free transmission, and reference signals (RSs) are provided in six symbols, consecutively, in one slot (or one subframe).

Looking at the channel configuration of FIG. 4A as a base, the channel configuration of FIG. 4B adds two symbols to the channel configuration of FIG. 4A. This minimizes the difference between the channel configuration for UL grant-free transmission and the channel configuration for UL grant-based transmission, so that, in the radio base station, a common channel estimation algorithm can be used.

Meanwhile, the channel configuration of FIG. 4B is a channel configuration for use in UL grant-free transmission, and reference signals (RSs) are provided in six symbols (intermittently) in one slot. Meanwhile, the channel configuration of a bottom of FIG. 4B is a channel configuration for use in UL grant-free transmission, and reference signals (RSs) are provided in six symbols (intermittently) in one slot. In this way, by adopting a configuration (channel configuration) that increases reference signals in the time direction, detection at the radio base station can be facilitated and user can be identified with high accuracy.

Looking at the channel configuration of FIG. 4B as a base, the channel configuration of FIG. 4B adds two symbols to the channel configuration of FIG. 4B. This minimizes the difference between the channel configuration for UL grant-free transmission and the channel configuration for UL grant-based transmission, so that, in the radio base station, a common channel estimation algorithm can be used.

Figure 5:
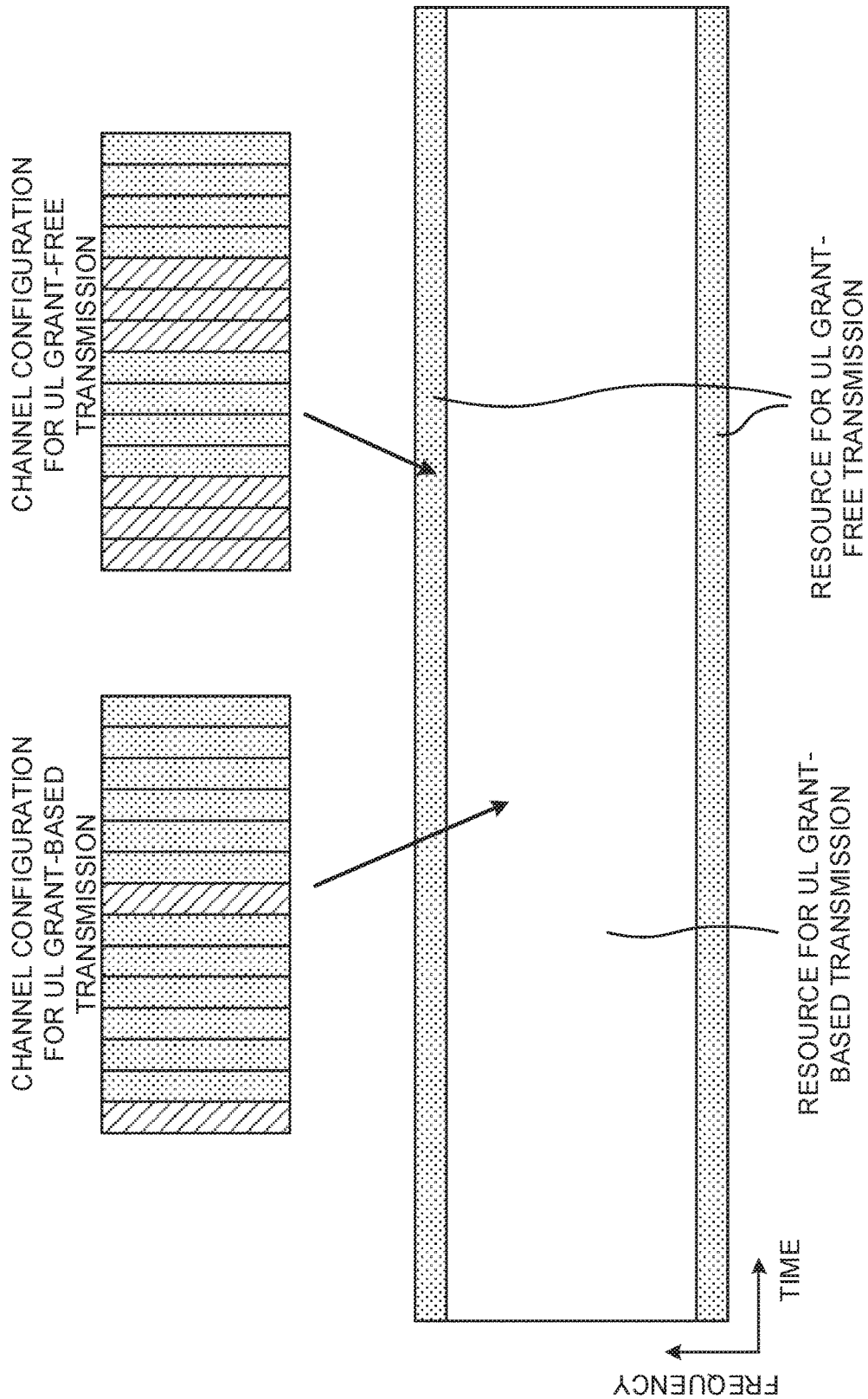
FIG. 5 is a diagram to show a case where the channel configuration of FIG. 4A is applied to the resources shown in FIG. 2.

FIG. 5 is a diagram to show a case where the channel configuration of FIG. 4A is applied to the resources shown in FIG. 2. As shown in FIG. 5, a reference signal of a channel configuration for use in UL grant-based transmission is applied to a resource for UL grant-based transmission, and reference signal of a channel configuration for use in UL grant-free transmission is applied to a resource for UL grant-free transmission. UE transmits data using different channel configurations, depending on whether the UL data to be transmitted is transmitted in UL grant-based transmission or in UL grant-free transmission. In the event of UL grant-based transmission, the user terminal transmits UL data in a configuration with few reference signals, so that it is possible to reduce the overhead and improve the data rate.

Next, identification of UEs in UL grant-free transmission will be described. Information relating to a reference signal is reported from the radio base station to the user terminal through higher layer signaling. This information includes the identification of the UE in UL grant-free transmission, the sequence of reference signals (the PN (Pseudo-Noise) number, the CAZAC (Constant Amplitude Zero Auto Correlation) number etc.), the cyclic shift number/code number of the reference signal, the number of symbols of the reference signal in a TTI and so on. Also, the radio base station may be configured to assign specific HARQ process IDs to UL grant-free transmission, and schedule UL grant-based transmission using other HARQ process IDs. The sequence of the reference signal and the cyclic shift number/code number of the reference signal can be obtained from the UE-ID, PCID (Physical Cell Identifier), VCID (Virtual Cell ID), beam ID, and so on.

By allocating these pieces of identification information (reference signal parameters, etc.) differently, per user to which UL grant-free transmission is applied, the radio base station can identify between users in UL grant-free transmission. When allocating such identification information to users, two methods may be possible.

The first allocation method is the method of assigning identification information for UL grant-free transmission to each user individually. In this method, identification information is assigned to a number of users to match the number of pieces of identification information. That is, according to this method, different pieces of identification information are assigned on a per user basis. The radio base station performs blind detection of all identification information and specifies the users engaged in UL grant-free transmission. According to this method, occurrence of collisions between identification information can be avoided.

The second allocation method is a method of sharing identification information for UL grant-free transmission in a group comprised of a plurality of users. That is, in the second allocation method, a given group of identification information for UL grant-free transmission is assigned to a group which includes a plurality of users. In this case, there may be a larger number user groups than the groups of identification information.

When making UL transmission, a user selects and uses a specific reference signal out of a group of identification information. According to this method, even when there are more users than the resources of identification, the users can be identified. Note that, according to this method, although collisions of identification information occur at a certain rate, by adjusting the number of user terminals that share identification information and configuring user groups on the radio base station side, it is possible to reduce the rate of collisions of identification information. Note that information about identification information groups may be reported from the radio base station to the user terminal semi-statically or dynamically by higher layer signaling.

Next, specific procedures of UL grant-free transmission according to the present invention will be described. Here, assume that, as shown in FIG. 2, resources for UL grant-free transmission are configured. First, the user terminal performs UL grant-free transmission using resources for UL grant-free transmission.

The radio base station performs blind detection or DTX (discontinuous reception) detection of reference signals continuously, and so detects UL grant-free transmission. Upon detecting UL grant-free transmission, the radio base station demodulates the data. Upon demodulating the data successfully, the radio base station transmits a UL grant to the user terminal. In this way, if the user terminal has more data to transmit, UL grant-based transmission is performed after UL grant-free transmission. In UL grant-free transmission, information about the buffer capacity of transmission data which the UE holds may be included (for example, a buffer status report: BSR). As a result, the radio base station detecting UL grant-free transmission can appropriately control the radio resources and parameters such as the modulation scheme for additional data transmission, for the UE.

On the other hand, when the radio base station is unable to demodulate data, the radio base station commands retransmission to the user terminal by using a UL grant. In this case, although the radio base station has failed to demodulate data, the user that has performed the UL grant-free transmission can be specified based on identification information such as reference signals.

If the radio base station cannot demodulate data or specify the user that has performed the UL grant-free transmission, the user terminal performs UL grant-free transmission again. In this case, the user terminal performs UL grant-free transmission again after having confirmed that no UL grant has been received. According to this procedure, even when UL grant-free transmission is applied, communication can be performed appropriately.

Note that, when information about the buffer capacity of transmission data held by the UE is included in UL grant-free transmission (for example, a buffer status report: BSR), when retransmission is made, whether this retransmission is UL grant-free transmission or UL grant-based transmission, information about the buffer capacity of transmission data which the user terminal holds (for example, a buffer status report: BSR) may be included again. In this case, this information can be retransmitted until data is properly received at the radio base station, so that more adequate scheduling control can be realized.

(UL Power Control)

As described above, UL grant-free transmission is employed in future radio communication systems. In this case, UL grant-free transmission and UL grant-based transmission are co-present in a radio communication system. For example, it may occur that the first transmission is made in UL grant-free transmission and the next transmission is made in UL grant-based transmission. In such a case, how to control the transmission power is the problem. Two methods are possible for transmission power control (TPC) in this case.

In the first method, in UL grant-free transmission and UL grant-based transmission, TPC parameters and accumulation of TPC commands are separately. According to the first method, accumulation of TPC commands is applied to UL grant-based transmission, and accumulation of TPC commands is not applied to UL grant-free transmission.

In the first method, the value of the TPC parameter $\alpha$ may be configured differently between UL grant base transmission and UL grant-free transmission. For example, in UL grant-based transmission, the TPC parameter $\alpha$ is configured to be less than 1. That is, in the event of UL grant-based transmission, from the viewpoint of throughput improvement it is better to apply fractional TPC, so that the TPC parameter $\alpha$ is configured to less than 1. On the other hand, in UL grant-free transmission, the TPC parameter $\alpha$ is configured to 1. This is because UL grant-free transmission focuses more on reduction of collisions, interference against other cells and so on, than on fractional TPC-based throughput improvement, so that it is preferable to configure the TPC parameter to a value at which interference is less likely to be produced.

The second method is a method of making the TPC parameter and accumulation of TPC commands common between UL grant-free transmission and UL grant-based transmission. In the second method, transmission power control (TPC parameter configuration, TPC command accumulation etc.) is performed in UL grant-based transmission, and UL grant-free transmission is performed based on this transmission power control. As a result, transmission power control can be shared between both transmission methods, so that the transmission signal processing in the terminal can be simplified.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 6:
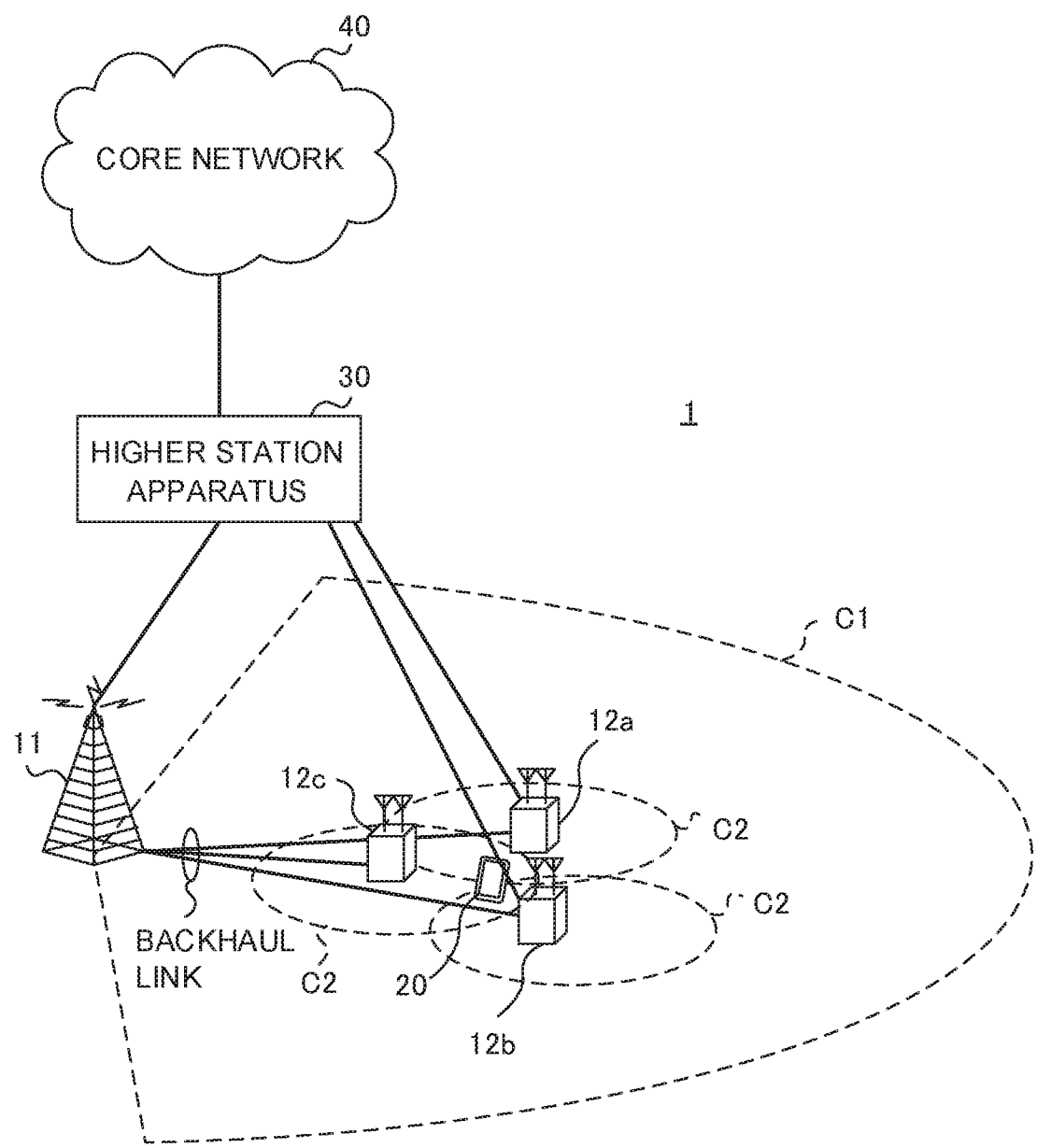
FIG. 6 is a diagram to show an example of a schematic structure of a radio communication system according to one embodiment of the present invention.

FIG. 6 is a diagram to show an example of a schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

In the radio communication system 1, the user terminal transmits UL data and a reference signal to the radio base station without a UL grant. In this case, a reference signal that can identify the user terminal is applied as the reference signal, and the UL data and the reference signal are transmitted using predetermined resources that are configured in advance.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "FRA (Future Radio Access)," "New-RAT (Radio Access Technology)," "NR (New Radio)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. The arrangement of cells and user terminals 20 are not limited to those shown in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "gNB," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

The radio communication system 1 may be configured so that different numerologies are used within cells and/or between cells. Note that a numerology refers to, for example, a set of communication parameters (for example, the subcarrier spacing, the bandwidth, etc.) that are used to transmit and receive a certain signal.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRSs may be referred to as "user terminal-specific reference signals (UE-specific reference signals). Also, the reference signals to be communicated are by no means limited to these.

(Radio Base Station)

The radio base station receives UL data and a reference signal that are transmitted from a user terminal without a UL grant, identifies the user terminal that has transmitted the UL data based on the reference signal, and, based on the received result of the UL data, transmits a UL grant to command new UL data transmission and/or retransmission.

Figure 7:
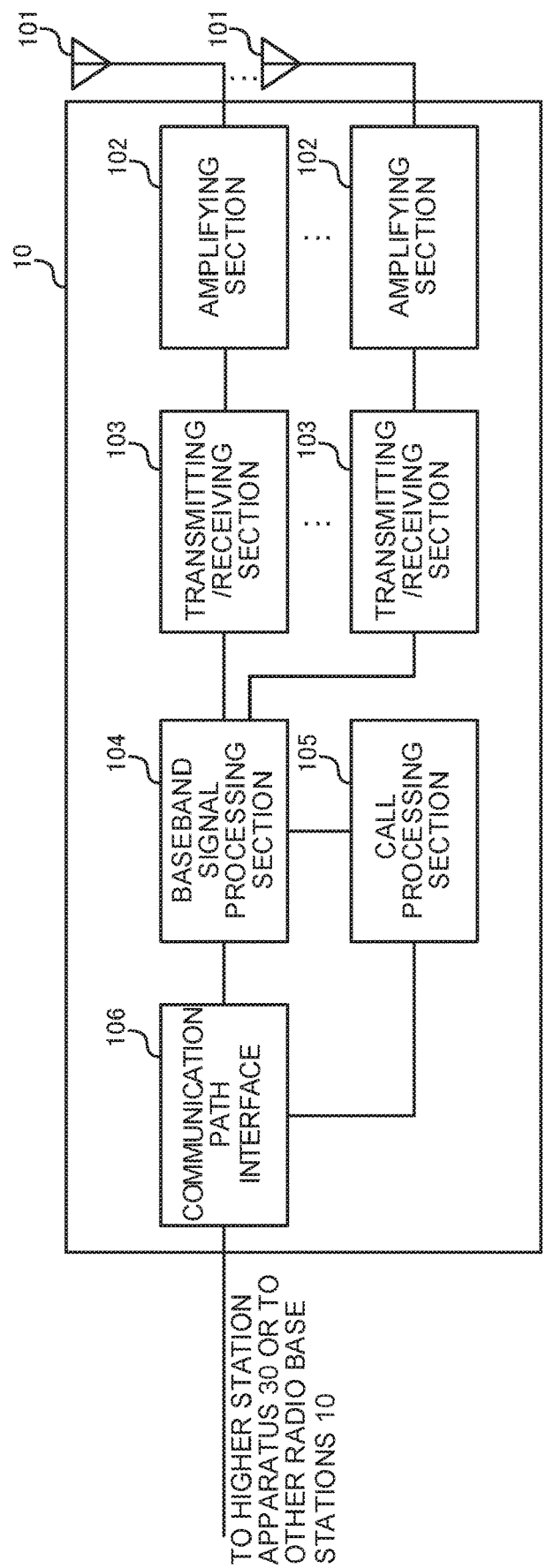
FIG. 7 is a diagram to show an example of an overall structure of a radio base station according to one embodiment of the present invention.

FIG. 7 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Figure 8:
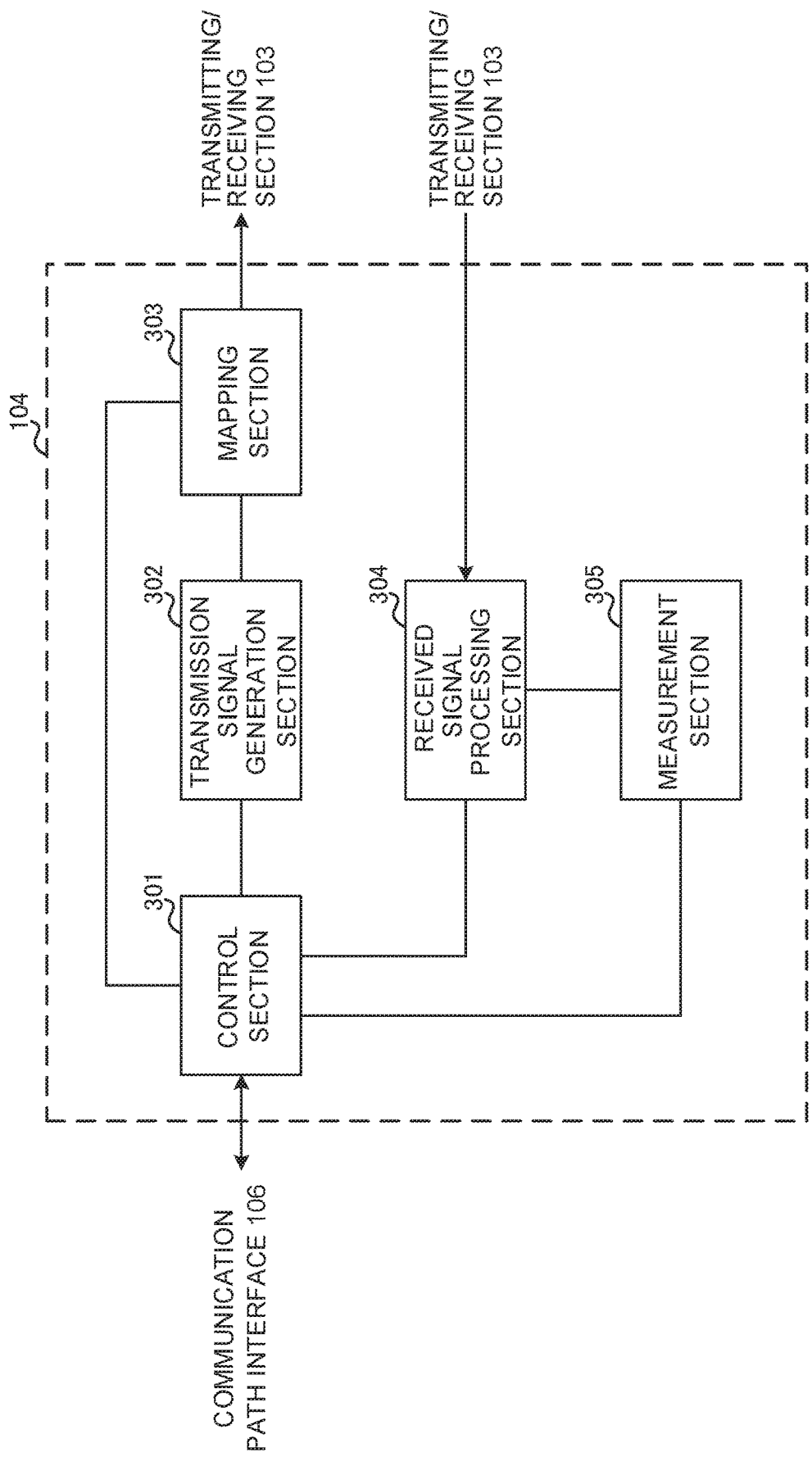
FIG. 8 is a diagram to show an example of a functional structure of a radio base station according to one embodiment of the present invention.

FIG. 8 is a diagram to show an example of functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in downlink control channels). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

In addition, the control section 301 exerts control so that the blind detection or DTX detection of reference signals are continuously performed. The control section 301 may exert control so that data is demodulated when UL grant-free transmission is detected, and a UL grant is transmitted to the user terminal when data is successfully demodulated. Also, the control section 301 may exert control so that a UL grant commands retransmission to the user terminal when data is not demodulated successfully.

In addition, the control section 301 may exert control to assign identification information such as reference signal parameters and HARQ process IDs to users where grant-free transmission is applied.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example CSI) and so on. The measurement results may be output to the control section 301.

(User Terminal)

Figure 9:
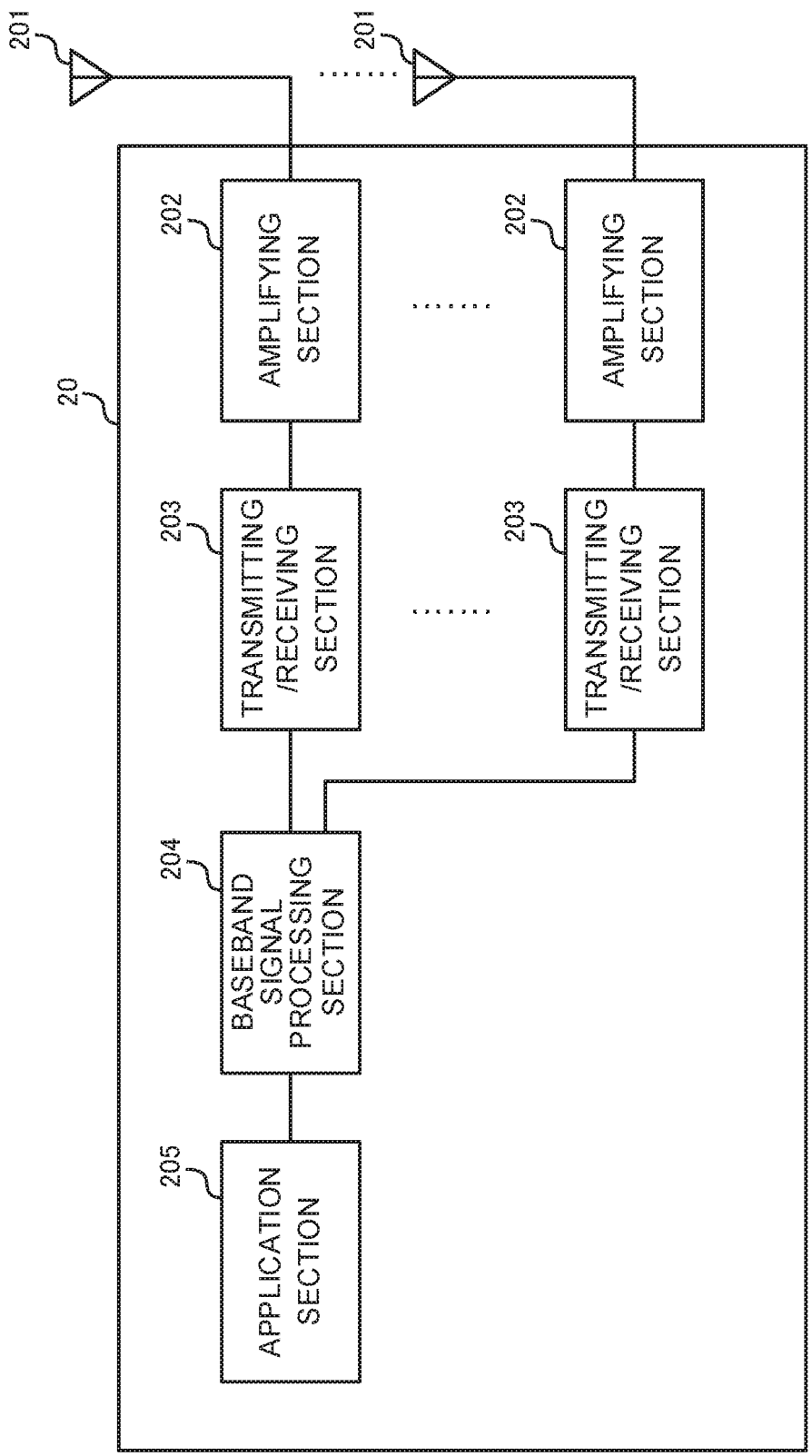
FIG. 9 is a diagram to show an example of an overall structure of a user terminal according to one embodiment of the present invention.

FIG. 9 is a diagram to show an example of an overall structure of a user terminal according to one embodiment of the present invention. A user terminal has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 10:
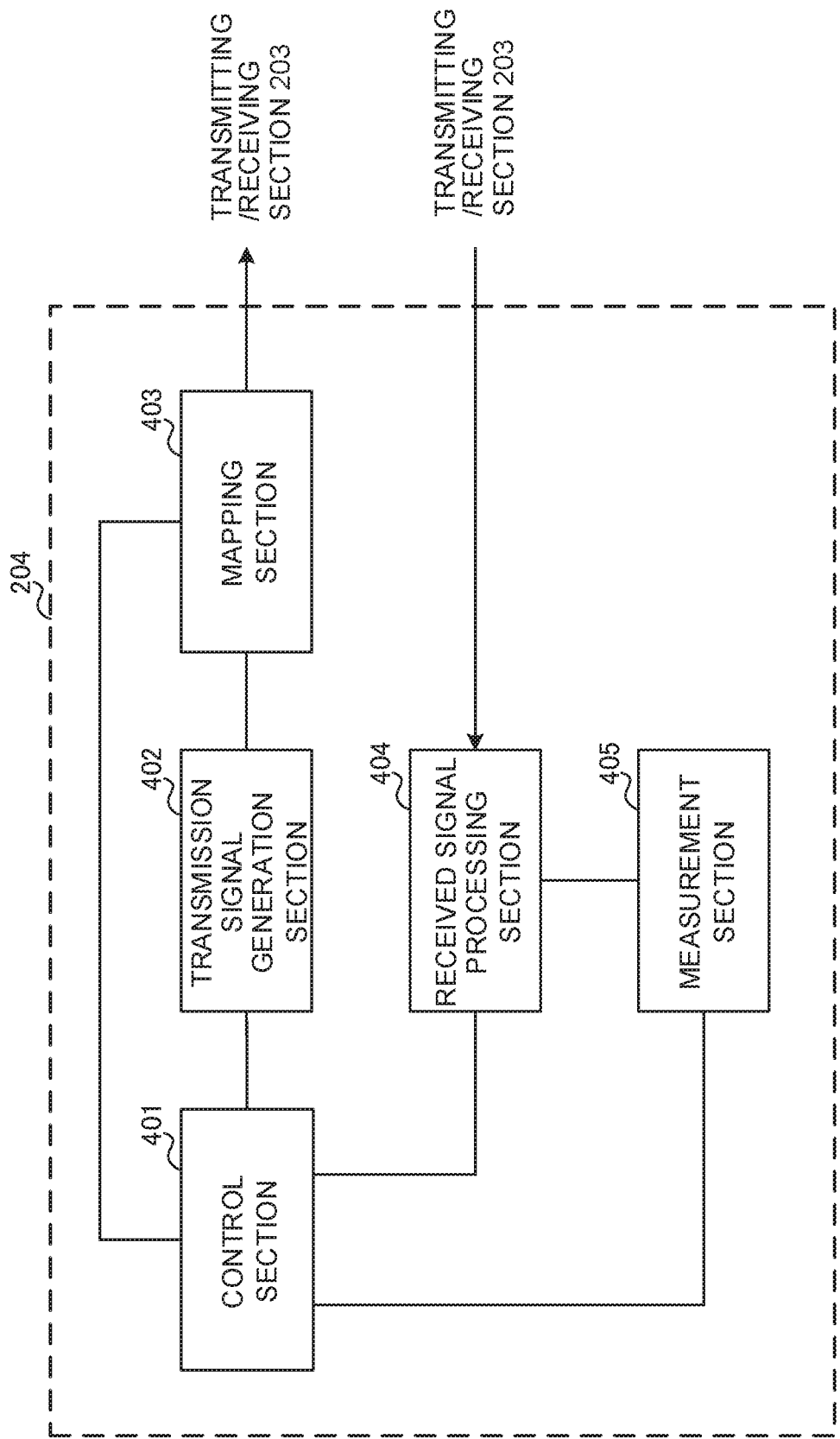
FIG. 10 is a diagram to show an example of a functional structure of a user terminal according to an embodiment of the present invention.

Also, for the downlink control channel allocation candidates that are arranged over multiple symbols, the transmitting/receiving sections 203 can perform the receiving processes by using at least the reference signal assigned to the first symbol in a plurality of symbols (see FIG. 10 and others). Also, the transmitting/receiving sections 203 can perform the receiving processes for different downlink control channel allocation candidates by using a common reference signal (see FIGS. 11, 12, and 14, etc.).

FIG. 10 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (for example, signals transmitted in downlink control channels) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 may exert control so that, when the radio base station cannot demodulate data or specify a user that has performed UL grant-free transmission—that is, when nothing is transmitted from the radio base station—UL grant-free transmission is performed again. In this case, the control section 401 may exert control so that UL grant-free transmission is performed again after it is confirmed that no UL grant has been received.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 11:
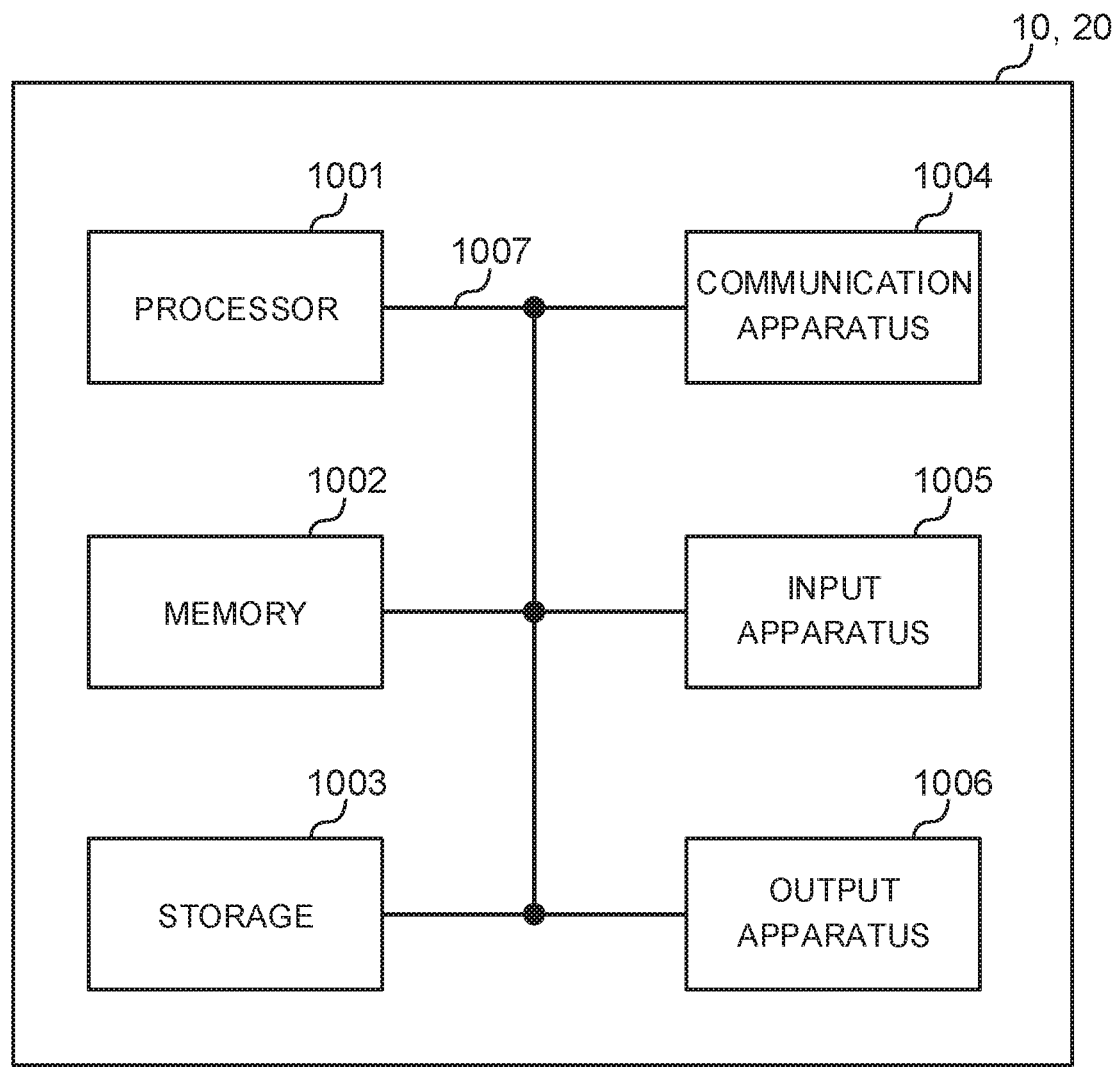
FIG. 11 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 11 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus.

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling"). Also, "signals" may be "messages. A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe. Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on.

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-018952, filed on Feb. 3, 2017, including the specification, drawings and abstract, is incorporated herein by reference in its entirety.

The invention claimed is:

1. A terminal comprising:
a transmission section that performs UL data transmission without a UL grant from a radio base station in a first transmission and performs UL data transmission in accordance with a UL grant from the radio base station in a second transmission; and
a control section that controls so that a transmission power parameter of the UL data transmission without the UL grant and a transmission power parameter of the UL data transmission in accordance with the UL grant are different from each other,
wherein in the UL data transmission without the UL grant, reference signal configuration for the UL data transmission in accordance with the UL grant and reference signal configuration for the UL data transmission without the UL grant are different from each other.

2. The terminal according to claim 1, wherein the UL data transmission in accordance with the UL grant is applied with fractional transmission power control.

3. The terminal according to claim 2, wherein the UL data transmission without the UL grant and the UL data transmission in accordance with the UL grant are configured to have different transmission power control parameters a.

4. The terminal according to claim 1, wherein resource allocation for the UL data transmission without the UL grant is provided by RRC.

5. The terminal according to claim 1, wherein resource allocation for the UL data transmission without the UL grant is provided by downlink control information.

6. A radio communication method comprising:
performing UL data transmission without a UL grant from a radio base station in a first transmission and performing UL data transmission in accordance with a UL grant from the radio base station in a second transmission; and
controlling so that a transmission power parameter of the UL data transmission without the UL grant and a transmission power parameter of the UL data transmission in accordance with the UL grant are different from each other,
wherein in the UL data transmission without the UL grant, reference signal configuration for the UL data transmission in accordance with the UL grant and reference signal configuration for the UL data transmission without the UL grant are different from each other.

7. The terminal according to claim 2, wherein resource allocation for the UL data transmission without the UL grant is provided by RRC.

8. The terminal according to claim 2, wherein resource allocation for the UL data transmission without the UL grant is provided by downlink control information.

9. The terminal according to claim 3, wherein resource allocation for the UL data transmission without the UL grant is provided by RRC.

10. The terminal according to claim 3, wherein resource allocation for the UL data transmission without the UL grant is provided by downlink control information.

* * * * *